2 Sheets—Sheet 1.

E. STABLER.

Magazine Fire-Arm.

No. 1,965.

Reissued May 23, 1865.

Witnesses.

W. C. Dodge

E. M. Read

Inventor

Edw. Stabler

N. PETERS, PHOTO-LITHOGRAPHER, WASHINGTON, D. C.

2 Sheets—Sheet 2.

E. STABLER.

Magazine Fire-Arm.

No. 1,965.

Reissued May 23, 1865.

Witnesses
W. C. Dodge
E. M. McKean

Inventor.
Edw. Stabler

N. PETERS, PHOTO-LITHOGRAPHER, WASHINGTON, D. C.

UNITED STATES PATENT OFFICE.

EDWARD STABLER, OF SANDY SPRINGS, MARYLAND.

IMPROVEMENT IN MAGAZINE FIRE-ARMS.

Specification forming part of Letters Patent No. 46,828, dated March 14, 1865; Reissue No. 1,965, dated May 23, 1865.

*To all whom it may concern:*

Be it known that I, EDWARD STABLER, of Sandy Springs, Montgomery county, and State of Maryland, have invented certain new and useful Improvements in Magazine Fire-Arms; and I do hereby declare that the following is a full, clear, and exact description thereof, reference being had to the accompanying drawings, making part of this specification, and to the letters of reference marked thereon, in which—

Figure 1:
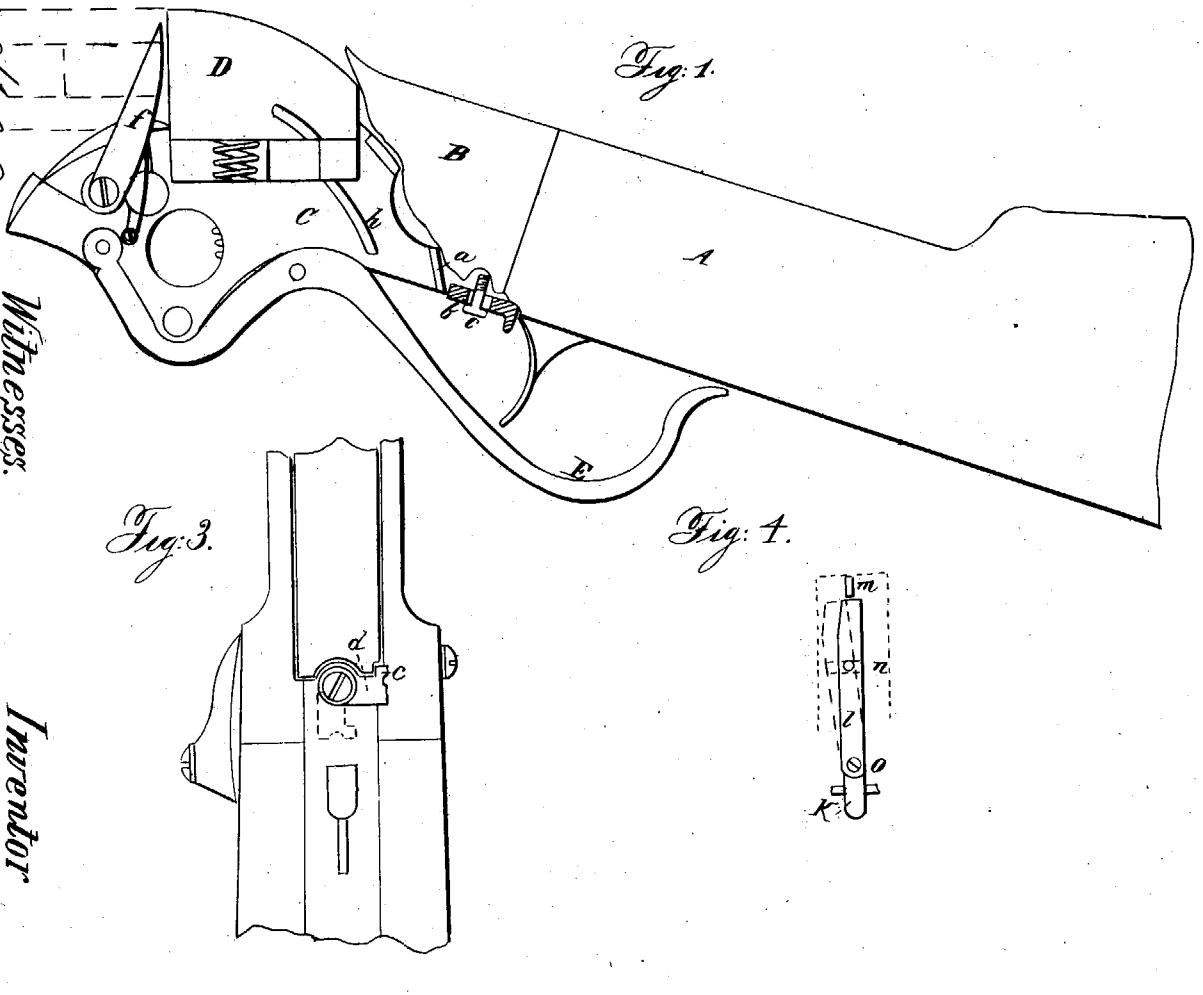
Figure 2:
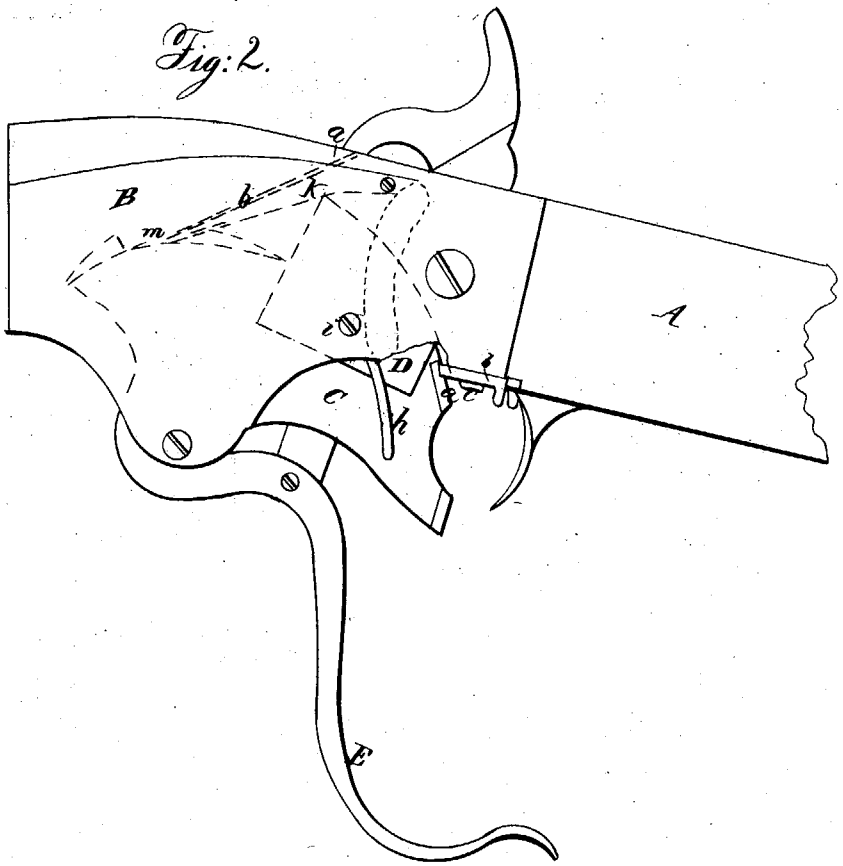

Figure 1 is a side view of a portion of a magazine-gun with a portion broken away for the purpose of more clearly illustrating my improvement. Fig. 2 is a side view of the same, showing the operation of the improvement; Fig. 3, an under-plan view, showing my improvement applied in a different manner; and Fig. 4 is a view of a detached portion, showing still another modification or method of applying my improvement.

A represents the stock, and B the portion which unites the stock to the barrel.

As is well known, there are two styles of magazine-guns in use, one which has the magazine lying along the barrel in front of the lock and another having the magazine located in the stock in the rear of the lock. It is to this latter class that my invention is intended to apply.

In practice it is frequently desirable to be able to convert the arm at will from a repeater to a single loader, and vice versa, for the purpose of reserving the cartridges in the magazine for a sudden emergency. At other times, when the magazine has been exhausted, and there is not time, or it is otherwise inconvenient to recharge it, the necessity for loading by hand is equally apparent. As this arm was originally constructed there were two difficulties in the way of this operation of loading by hand. The first was the fact that if the carrier-block was rotated, as usual, when loading from the magazine, the retractor *f* would be thrown over back so far that the cartridge would be inserted in advance of the retractor, which would render the arm inoperative and dangerous. This difficulty was remedied by the improvement patented to me on the 6th day of December, A. D. 1864. The second difficulty consists in the fact that if the carrier-block be thrown back in the usual manner, and a cartridge be inserted by hand, a second cartridge will be received from the magazine, which latter cartridge, as the carrier-block is moved forward to close the breech, will also be carried up and forced against the one already inserted, thus preventing the closing of the parts, and consequently the use of the arm.

My improvement in this case is intended to remedy this last difficulty, and also to render the first even less liable to happen than it now is.

My invention consists simply in applying to the carrier-block a check or stop, which shall arrest its backward movement at such a point as will prevent the retractor *f* from leaving its position at the end of the barrel, and at the same time not let the carrier-block go back far enough to receive another cartridge from the magazine. This I accomplish in a variety of ways.

In Fig. 1, *a* represents a channel or groove cut in the edge of the carrier-block, or it may be located in the center of the periphery of the block. I then attach a slide, *b*, by means of a screw, *c*, passing through a slot therein, underneath the stock, in such a position that when it is shoved forward, as shown in Fig. 2, its front end shall enter the channel or groove *a*. With this arrangement it is obvious that the carrier-block can be rotated only the length of the channel *a*, its further movement being arrested by the shoulder at the upper end of the channel as it comes in contact with the front end of slide *b*. This channel *a* must, of course, be made of the proper length, so as to stop the movement of the block at the desired point. In this manner I am enabled to accomplish both objects desired at one and the same time, and in the most simple and efficient manner.

Whenever it is desired to use the magazine it is only necessary to move the slide *b* back, as shown in red in Fig. 2, and thus the arm can instantly be converted at will from a magazine-gun into a single loader, and vice versa.

In Fig. 3 another method of accomplishing the same object is shown. In this case I apply the button or check *d* in such a position that when turned, as shown, the point *e* will enter the channel *a* and arrest the movement of the carrier-block at the desired point, the same as the slide *b* did in the former case.

When it is desired to use the magazine, the button *d* is turned in the position shown in red, when the block is permitted to rotate to its full extent.

Still another method is shown in Figs. 1 and 2. A groove, *h*, may be cut in the side of the carrier-block, as there shown, and a screw or small bolt, *i*, inserted through the side of the case or frame B in such a position that its inner end shall enter the groove *h*, which will be made of the required length. In this case the change is effected by simply turning the screw *i* in or out, as it is obvious that when its end enters the channel *h* the movement of the carrier-block will be limited to the length of said groove or channel, whereas when the screw is turned out, so that its inner end will clear the block entirely, the latter may be moved to its full extent.

Fig. 4 represents still another device for accomplishing the desired object, the parts being shown in position in red lines in Fig. 2. In this case I simply pivot a metal strip, *l*, on top of the bridge-piece *k*, over which the cartridge-shell slides when being removed from the barrel after firing, the strip *l* being pivoted at *o* in such a manner that it can have its front end moved to one side, as shown in red in Fig. 4, which is a top-plan view of the parts. A small screw, *n*, working in a recess, as shown, serves to limit the movement of *l*, so as to prevent its front end from being thrown around so far as to rest upon the top of frame B at the side of block D, which, if done, would cause *l* to be broken or injured. As the carrier-block is rotated backward, the front end of *l*, when in position, will come in contact with the projection *m*, and thus prevent its further movement.

When it is desired to use the magazine, it is only necessary to shove the stop *l* to one side, when it will clear the projection *m* and allow the carrier-block to rotate to its full extent.

It is obvious that a great variety of mechanical devices or equivalents may be adopted to produce the desired result of limiting the movement of the carrier-block, and thus carry out or apply my invention; and therefore I do not limit myself to any or all the methods or devices here shown for accomplishing the object.

It is also obvious that my invention may be applied to any and all magazine-guns constructed on this general plan; and therefore I do not limit myself to its application to the Spencer arm alone, but intend to claim it broadly, whatever the method used for applying it, and without regard to the particular arm to which it may be applied, it being distinctly understood that I make no claim in reference to any except that class of fire-arms in which the magazine is located in the rear of the lock.

Having thus fully described my invention and several methods of applying the same, what I claim is—

1. Limiting or arresting the movement of the carrier-block in the class of fire-arms herein described at any desired point, for the purpose of converting the arm from a repeater into a single loader, substantially as described.

2. I claim the stop *b* or its equivalent, in combination with the rotating carrier-block of a magazine-gun, operating as and for the purpose herein set forth.

EDWD. STABLER.

Witnesses:
W. C. DODGE,
P. T. DODGE.